(12) United States Patent
Lee

(10) Patent No.: US 10,743,577 B2
(45) Date of Patent: Aug. 18, 2020

(54) TURNTABLE-TYPE BREADCRUMB COATING MACHINE

(71) Applicant: Geunyeong Lee, Cheonan-si (KR)

(72) Inventor: Geunyeong Lee, Cheonan-si (KR)

( * ) Notice: Subject to any disclaimer, the term of this patent is extended or adjusted under 35 U.S.C. 154(b) by 238 days.

(21) Appl. No.: 15/771,741

(22) PCT Filed: Nov. 2, 2016

(86) PCT No.: PCT/KR2016/012492
§ 371 (c)(1),
(2) Date: Apr. 27, 2018

(87) PCT Pub. No.: WO2017/078382
PCT Pub. Date: May 11, 2017

(65) Prior Publication Data
US 2018/0303148 A1 Oct. 25, 2018

(30) Foreign Application Priority Data

Nov. 2, 2015 (KR) .................. 10-2015-0153300
Jan. 13, 2016 (KR) .................. 10-2016-0004442
(Continued)

(51) Int. Cl.
*A23P 1/08* (2006.01)
*A23P 20/12* (2016.01)
(Continued)

(52) U.S. Cl.
CPC .............. *A23P 20/12* (2016.08); *A23L 13/03* (2016.08); *A23P 20/17* (2016.08); *B65G 15/44* (2013.01); *B65G 17/12* (2013.01)

(58) Field of Classification Search
CPC ............ A23P 20/12; A23P 20/17; A23L 13/03
See application file for complete search history.

(56) References Cited

U.S. PATENT DOCUMENTS 3,380,432 A * 4/1968 Hester .................. A23P 20/12
118/16

FOREIGN PATENT DOCUMENTS

JP 2001-190260 A 7/2001
JP 2006-333817 A 12/2006
(Continued)

OTHER PUBLICATIONS

English translation of KR20140082290A (Year: 2014).*

*Primary Examiner* — Jun S Yoo
(74) *Attorney, Agent, or Firm* — Novick, Kim & Lee, PLLC; Jae Youn Kim

(57) ABSTRACT

A breadcrumb coating machine includes a breadcrumb coating unit for spreading and fixing breadcrumbs on the front and rear surfaces of pork. The breadcrumb coating unit has an octagonal frame formed in a regular octagon shape and disposed on an upper surface of a base; a turntable having breadcrumbs dispersed over the surface thereof and configured to rotate on the upper surface of the octagonal frame; first and second scattering units configured to draw the breadcrumbs dispersed on the surface of the turntable and to scatter the same over the upper surface of the pork; and a pressing plate disposed at an interval from the first and second scattering units in a clockwise direction to press the upper surface of the pork, while adjusting a pressure by using a cylinder.

1 Claim, 8 Drawing Sheets

(30) Foreign Application Priority Data

Apr. 15, 2016 (KR) .......................... 10-2016-0046515
May 9, 2016 (KR) .......................... 10-2016-0056579

(51) Int. Cl.
*A23L 13/00* (2016.01)
*B65G 17/12* (2006.01)
*B65G 15/44* (2006.01)
*A23P 20/17* (2016.01)

(56) References Cited

FOREIGN PATENT DOCUMENTS

| | | | |
|---|---|---|---|
| KR | 20060031440 A | * | 4/2006 |
| KR | 10-0875736 B1 | | 12/2008 |
| KR | 10-2014-0025261 A | | 3/2014 |
| KR | 20140082290 A | * | 7/2014 |

* cited by examiner

TURNTABLE-TYPE BREADCRUMB COATING MACHINE

TECHNICAL FIELD

The present disclosure relates to a turntable-type breadcrumb coating machine, and more particularly, to a turntable-type breadcrumb coating machine which can evenly and automatically coat breadcrumbs on a meat (pork), which is covered with egg wash and is spread, to make a pork cutlet or croquette, and thus increases productivity.

BACKGROUND ART

Generally, a pork cutlet refers to a dish that is made by cutting pork of a predetermined size thin, covering the pork with batter, breadcrumbs, and seasonings in sequence, and then deep-frying, and is provided with various kinds of sources.

Such a pork cutlet is one of the foods that are popular among people from children to adults, and in recent years, restaurants specializing in pork cutlets are increasing, and accordingly, automation equipment for mass production of pork culets are increasingly introduced in many restaurants.

However, the automation equipment requires high initial investments since it requires large areas or should be associated with various additional facilities. In addition, since a sufficient space is required, plant equipment of an appropriate scale should be provided to make many industrial products.

In the case of a small pork cutlet-specialized store, since tenderizing should be performed by hitting pork piece by piece with a mallet, productivity may be reduced. In addition, since the process of coating pork with breadcrumbs should also be performed manually, quality may be degraded due to a difference in the degree of adherence of breadcrumbs according to a difference in skill.

In addition, it is difficult to stretch a piece of pork thinly and evenly, and also, may breadcrumbs may fall due to low adherence to the piece of pork when the pork is coated with the breadcrumbs. Therefore, there is a problem of poor quality.

In addition, since all breadcrumbs that do not adhere to a piece of meat are not automatically collected, there is inconvenience that an operator should directly collect them. Due to this inconvenience, breadcrumbs are not collected and are discarded, and therefore, there is a problem of an increasing manufacturing cost.

These problems may also arise when croquettes are made.

DETAILED DESCRIPTION OF THE PRESENT DISCLOSURE

Technical Objects

The present disclosure has been developed in order to solve the above-mentioned problems, and an object of the present disclosure is to provide a turntable-type breadcrumb coating machine, which can automatically and evenly coat breadcrumbs on meat, which is prepared in a slice state and spread, and has both surfaces covered with egg wash for making a pork cutlet or croquette, by using a turntable, and does not require equipment of a large scale, and can rapidly and easily coat breadcrumbs at a low cost, thereby contributing to enhancement of productivity.

Technical Solving Method

According to an embodiment of the present disclosure to achieve the above-described object, there is provided a turntable-type breadcrumb coating machine including: a breadcrumb coating unit configured to spread and to fix breadcrumbs on the front and rear surfaces of pork; an introduction unit configured to cover the pork with egg wash and to introduce the same into the breadcrumb coating unit; and a discharge unit configured to discharge the pork which is coated with breadcrumbs through the breadcrumb coating unit, wherein the breadcrumb coating unit includes: a turntable which has breadcrumbs dispersed on the surface thereof, and which is rotatably disposed on an upper surface of a base; first and second scattering units configured to draw the breadcrumbs, which are dispersed on the surface of the turntable, and to scatter the same over the upper surface of the pork; a first pressing roll disposed at an interval from the first and second scattering units in a clockwise direction, and configured to press the upper surface of the pork while adjusting a pressure; a second pressing roll disposed at an interval from the first pressing roll in the clockwise direction, and configured to rotate by self-supplied power to finish-press the upper surface of the pork, and to allow the pork coated with breadcrumbs to be elevated through a discharge tray and to be transferred to the discharge unit; a leveling blade disposed at an interval above the upper portion of the discharge tray, and configured to rotate to evenly scarf the breadcrumbs coated on the surface of the pork to have a constant thickness; and a breadcrumb supplier disposed between the introduction unit and the discharge unit so as to automatically supply breadcrumbs according to an amount of breadcrumbs remaining inside the turntable.

The first scattering unit may be a feeding conveyor that rotates in the form of a continuous track and transfers the breadcrumbs from the center of the turntable to a circumference, and may be in an upright position, and may have a lower end spaced from the bottom surface of the turntable by a distance.

In addition, the second scattering unit may be a wire mesh conveyor that rotates in the form of a continuous track and transfers the breadcrumbs from the center of the turntable toward the circumference, and may be in an upright position, and may have a lower end spaced from the bottom surface of the turntable by a distance, and one end disposed close to a portion of a length of the first scattering unit.

In addition, the first and second pressing rolls may be formed in a conical shape toward the center of the turntable.

In addition, the discharge unit may be disposed at an interval from the second pressing roll in the clockwise direction, and may include a discharge conveyor configured to transfer the pork discharged from an end of the discharge tray toward a packing box.

In addition, the discharge tray may include: a driving unit configured to receive a driving force and to rotate; a plurality of driving wheels configured to rotate by a rotational force of the driving unit; a pair of bar-type table frames; a plurality of wheel shafts assembled through the table frames to be rotatable; and driving wheels coupled to the wheel shafts at intervals and having protrusions and recesses formed on the circumferences thereof.

In addition, the breadcrumb supplier may include: a box-type case; first and second supply conveyors embedded in the case and disposed in multi-stage; and a plurality of rotary hitting mallets disposed on the upper portion of the second supply conveyor in plural rows.

In addition, shafts fixing the plurality of rotary hitting mallets arranged in plural rows may be gear-engaged with one another such that adjacent shafts are rotated in opposite direction to each other.

Advantageous Effect

According to the present disclosure, meat which is covered with egg wash and is spread for making a pork cutlet or croquette can be evenly and automatically coated with breadcrumbs, and thus there is an effect of increasing productivity.

In addition, breadcrumbs can be automatically supplied and the process of coating the breadcrumbs can be fully automated, and thus there are effects of reducing manpower and cost and enhancing productivity.

BEST MODE FOR EMBODYING THE INVENTION

Figure 1:
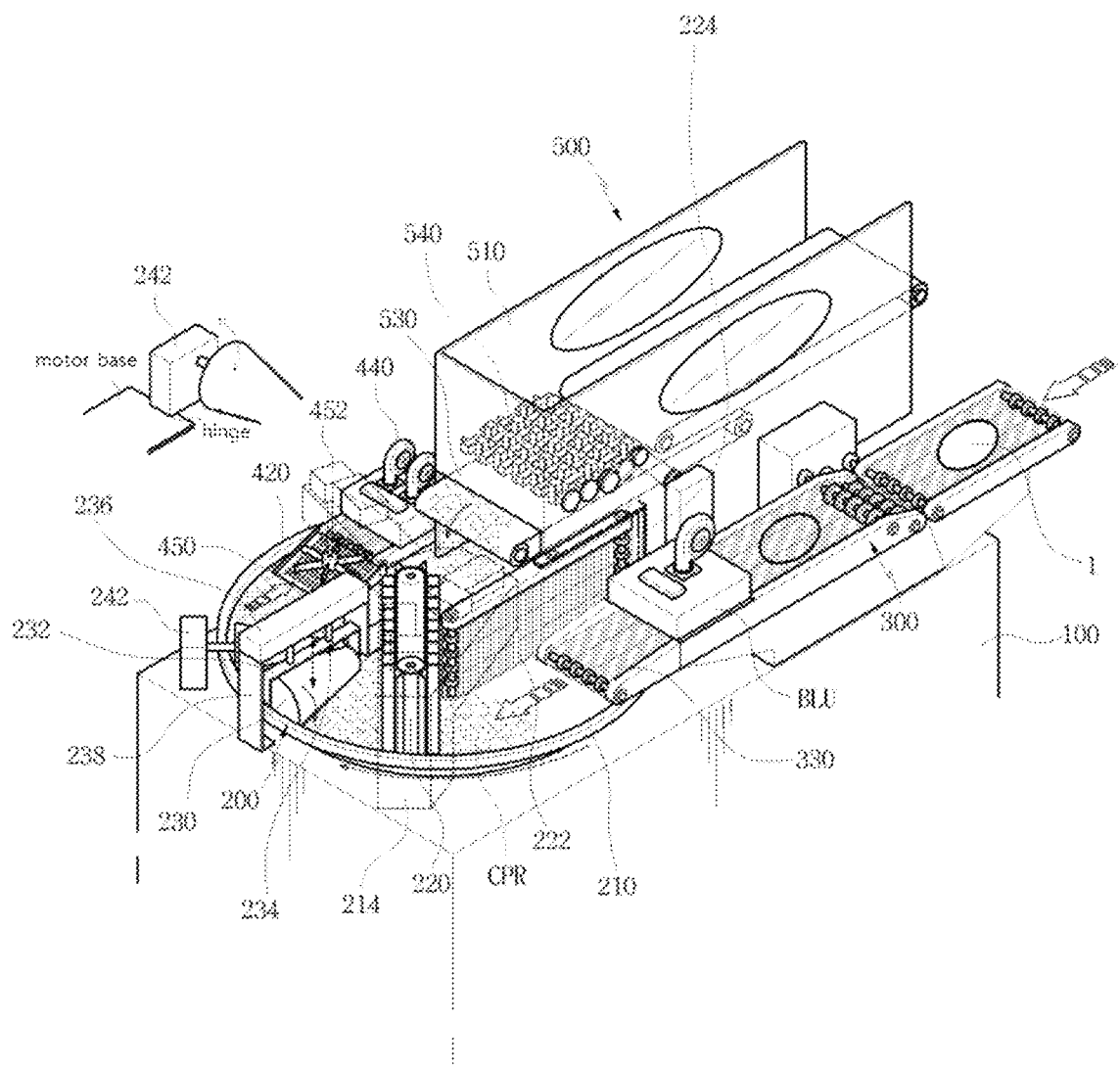
FIG. 1 is an exemplary perspective view of a turntable-type breadcrumb coating machine according to the present disclosure.

Hereinafter, preferred embodiments of the present disclosure will be described in detail with reference to the accompanying drawings.

Prior to describing the present disclosure, a specific structure or functions presented below are merely illustrated for the purpose of describing embodiments according to the concept of the present disclosure, and embodiments according to the concept of the present disclosure may be implemented in various forms and should not be interpreted as being limited to embodiments described in the present specification.

In addition, various changes can be made to embodiments according to the concept of the present disclosure, and embodiments may have various forms, and thus specific embodiments are illustrated in the drawings and described in detail in the specification. However, embodiments according to the concept of the present disclosure are not limited to a specific disclosure form and should be interpreted as including various changes, equivalents, or replacements included in the idea and technical range of the present disclosure.

In embodiments described hereinbelow, a pork cutlet producing example will be described by way of an example, but the embodiments are equally applied when croquettes are made.

Figure 2:
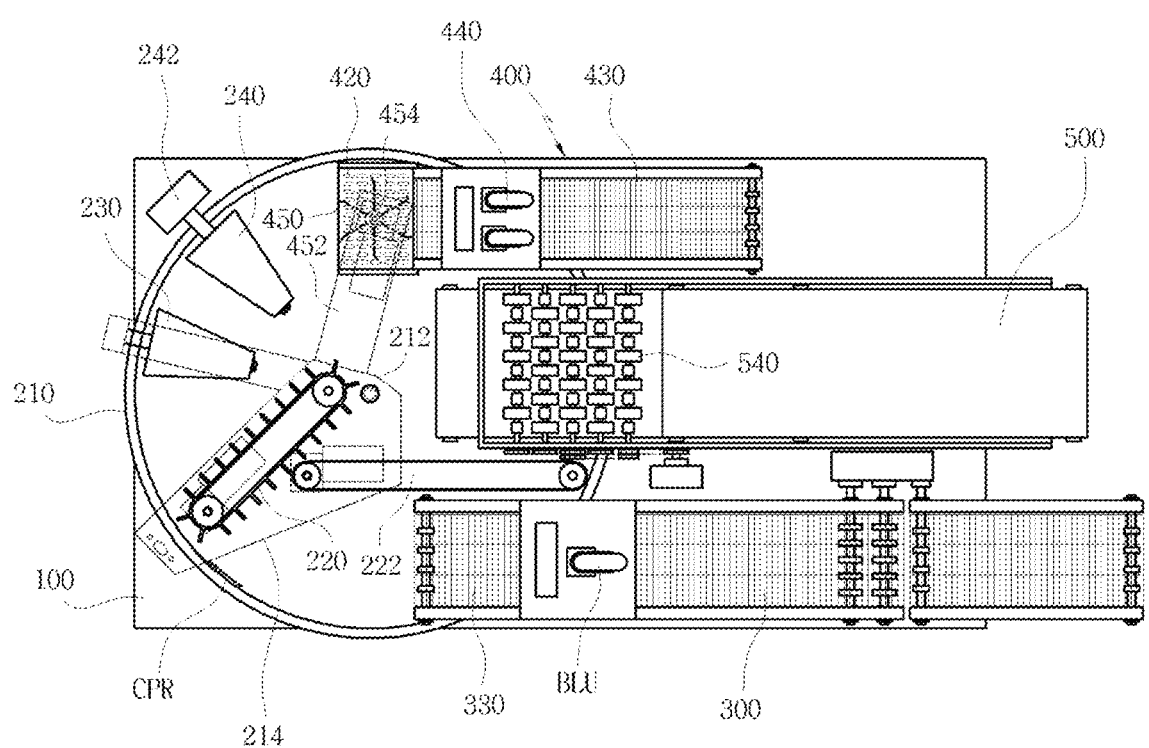
FIG. 2 is an exemplary top view of the turntable-type breadcrumb coating machine according to the present disclosure.
Figure 3:
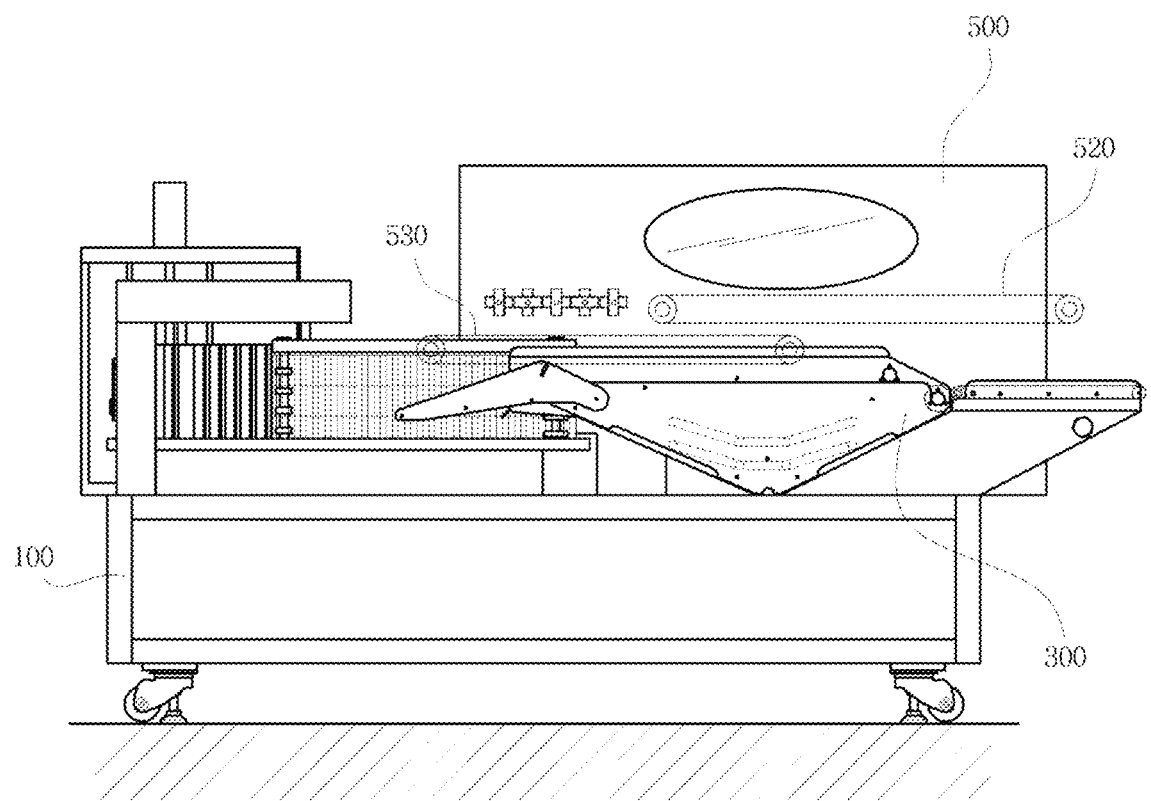
FIG. 3 is an exemplary side view of the turntable-type breadcrumb coating machine according to the present disclosure.

As shown in FIGS. 1 to 3, a turntable-type breadcrumb coating machine according to the present disclosure includes a base 100.

In this case, the base 100 may have a rectangular block shape or a rectangular frame shape according to a situation.

In addition, the base 100 may have a breadcrumb coating unit 200 disposed at one side of an upper surface thereof and including a turntable 210, and may have an introduction unit 300 and a discharge unit 400 disposed in parallel with each other to face the turntable 210.

In addition, a breadcrumb supplier 500 is provided between the introduction unit 300 and the discharge unit 400.

In this configuration, the breadcrumb coating unit 200 may include: a rotatable turntable 210; first and second scattering units 220, 222 which scatter and coat breadcrumbs on an upper surface of pork 1; and first and second pressing rolls 230, 240 which pressurizes and presses the upper surface of the pork 1 coated with the breadcrumbs.

Herein, the turntable 210 is configured to be rotated through a driving source (for example, a motor) separately provided under the base 100. The turntable 210 has a predetermined thickness along the circumference and has a protruding wall, that is, is formed in a cylindrical shape having an upper portion opened, such that breadcrumbs existing on a surface, that is, on the bottom surface of the turntable 210, are prevented from being scattered to the outside of the turntable 210.

It can be understood that, although breadcrumbs are less likely to be scattered since the turntable 210 is rotated at low speed, a kind of protrusion is formed to prevent breadcrumbs from being scattered in case breadcrumbs are scattered under the influence of a centrifugal force.

In addition, a fixing housing 214 is provided to have a table shaft 212, disposed at the center of the bottom surface of the turntable 210, inserted thereinto, to allow the table shaft 212 to be freely rotated without interfering with rotation of the turntable 210. The fixing housing 214 is spaced from the bottom surface of the turntable 210 by a predetermined height, and has a lower end fixed to the upper surface of the base 100.

In this case, the first scattering unit is suspended inside the fixing housing 214. The first scattering unit is a kind of feeding conveyor which is rotated in the form of a continuous track by a motor (not shown) fixed to the ceiling surface of the fixing housing 214, and the first scattering unit has a lower end spaced from the bottom surface of the turntable 210 by a predetermined height, in consideration of a thickness the pork 1 and a thickness of breadcrumbs to be coated on the pork 1.

In addition, the first scattering unit is controlled to be rotated in such a direction that the first scattering unit can scrape and transfer breadcrumbs from the center of the turntable 210 toward the circumference, for example, in a clockwise direction as in the drawing.

In addition, the second scattering unit 222 is disposed on a portion of the length of the first scattering unit in parallel with the introduction unit 300 at a predetermined interval therefrom. The second scattering unit 222 is a wire mesh conveyor provided in the form of a continuous track that is driven by a motor (not shown) embedded in the fixing housing 214 separately from the first scattering unit. In the same way as the first scattering unit, the second scattering unit 222 is suspended from a scattering unit fixer 224, being spaced from the bottom surface of the turntable 210 by a predetermined height, and is controlled to be rotated in a direction of scooping and transferring breadcrumb from the center of the turntable 210 toward the circumference.

In this case, the scattering unit fixer 223 is a member formed in the shape of "¬," and has a bent lower end securely fixed to the upper surface of the base 100 at a point distanced from the turntable 210.

In particular, the second scattering unit 222 is a wire mesh conveyor similar to an introduction guide conveyor 330 in an upright position, which will be described below, and has a plurality of thin wires arranged at predetermined intervals. Since the second scattering unit 222 is rotated in this state, breadcrumbs are caught between the wires and are dragged in the rotation direction of the second scattering unit 222, thereby being scattered.

To sum up, the first and second scattering unit 220, 222 may draw the breadcrumbs introduced into the center of the turntable 210 through the breadcrumb supplier 500, and scatter the same toward the circumference of the turntable 210, thereby letting the breadcrumbs naturally be dropped over the upper portion of the pork 1 and inducing the upper surface of the pork 1 to be coated with the breadcrumbs.

That is, some of the breadcrumbs are dispersed on the surface of the turntable 210, and the pork 1, which is spread meat, is dropped down to the breadcrumbs and is rotated along with the turntable 210. Therefore, since the lower surface of the pork 1 has been covered with the breadcrumbs, the operation of coating the upper surface of the pork 1 with the breadcrumbs by using the first and second scattering units 220, 220 is automatically performed.

In addition, when the pork 1 coated with the breadcrumbs passes through the first scattering unit 220, the breadcrumbs caught at the height of the first scattering unit 220 are scarfed (herein, "scarfing" refers to flattening a surface) and thus the coated breadcrumbs are automatically levelled, that is, flattened.

In addition, a shatter proof film (CPR) protruding by a predetermined length according to the curvature of the turntable 210 may further be disposed at one side of the fixing housing 214, more specifically, at a side of the fixing housing 214 through which the pork 1 enters after being dropped down and being rotated.

When the first scattering unit 220 is rotated in the form of a continuous track, the breadcrumbs drawn close to the circumference of the turntable 210, where the rotation direction of the first scattering unit 220 is changed, may be thrown out of the turntable 210 under the influence of inertia. The shatter proof film (CPR) prevents this.

In addition, the first pressing roll 230 may be disposed at an interval from the fixing housing 214 in the clockwise direction, and the second pressing roll 240 may be disposed at an interval from the first pressing roll 230 in the clockwise direction.

In this case, the first pressing roll 230 is a means for pressing the breadcrumbs coated on the upper surface of the pork 1 with a predetermined pressure, and allowing the same to well adhere to the pork 1. Since the first pressing roll 230 should have a pressure, the first pressing roll 230 are rotatably fixed by a roll bracket 232 having both ends formed a substantially inverse-U shape. The roll bracket 232 is fixed to a pressing rod 234, and the pressing rod 234 may be configured to press by using a spring or cylinder provided on a pressing means fixer 236. The pressing means fixer 236 may have one end vertically fixed to the upper surface of the base 100, and the other end fixed to one side of the fixing housing 214.

Accordingly, a force of pressing the upper surface of the pork 1 coated with the breadcrumbs, that is, the breadcrumbs, may be adjusted, and thus an operation may be performed in such a manner that there is less remainder of the breadcrumbs when the pork 1 is completely coated with the breadcrumbs.

In addition, the second pressing roll 240 is provided to perform a finish-pressing operation while rotating by using a driving force, and to perform the most important function of smoothly transferring the pork 1 to a discharge tray 420.

That is, the second pressing roll 240 prevents the pork 1 coated with the breadcrumbs from being pushed backwardly due to collision when the pork 1 enters the discharge tray 420 to be transferred through the discharge tray 420. This role of the second pressing roll 240 is applied to the breadcrumbs as well as the pork 1.

Accordingly, the second pressing roll 240 should have a force for pushing the pork 1 up, and thus should have a driving source. To achieve this, a pressing motor 242 is fixed to the upper surface of the base 100, and has a motor shaft (no reference numeral assigned) shaft-fixed to one end of the second pressing roll 240.

In addition, in the illustrated preferable embodiment, the second pressing roll 240 is fixed to a predetermined position. However, this should not be considered as limiting, and the second pressing roll 240 may be configured to have a height naturally adjustable in the vertical direction. This can be achieved by configuring a portion to which the pressing motor 242 is fixed to be movable. Since the pressing motor 242 and the second pressing roll 240 are always subject to a downward force due to their own weights, the pressing motor 242 and the second pressing roll 240 are elevated when the pork 1 passes, and descend after the pork 1 passes. Therefore, the pressing motor 242 and the second pressing roll 240 operate according to a thickness of coated breadcrumbs, such that the quality of the pork 1 can be uniformly maintained.

Although the above-described structure is schematically illustrated, the structure may be easily configured by providing a motor base having the pressing motor 242 fixed thereto, and hinge-fixing one end of the pressing motor 242 to the motor base.

Herein, the first and second pressing rolls 230, 240 are provided to press the breadcrumbs coated on the upper surface of the pork 1, such that the breadcrumbs well adhere to the pork 1, and are configured to press while rotating in the same direction as the rotation direction of the turntable 210, being spaced from the surface of the turntable 210 by a predetermined distance.

In particular, the first pressing roll 230 is configured to rotate by itself, and the second pressing roll 240 is configured to rotate by using a driving force, such that the first stage of pressing is performed and then the second stage of firmly pressing is performed, and the pork is completely and exactly coated with the breadcrumbs. Furthermore, the first and second pressing rolls 230, 240 are formed in a conical shape toward the center of the turntable 210. Specifically, when the pork 1 is placed on the surface of the turntable 210, there may be a deviation between a distance from the center of the turntable 210 to an inside end of the pork 1 and a distance to an outside end of the pork. Therefore, even when the inside end and the outside end of the pork 1 are rotated by the same angle, the length of an arc drawn by the inside end of the pork and the length of an arc drawn by the outside end are different. If a cylindrical pressing roll having the same diameter is used, the degree of pressing applied to the inside end and the degree of pressing applied to the outside end of the spread meat are different, and as a result, the entire surface of the meat is not evenly pressed. Therefore, the first and second pressing rolls 230, 240 may have a conical shape.

Although there may be no portion that is not pressed since the pork 1 is continuously rotated and moved, the pressing roll having a conical shape can more evenly press the pork by the same distance.

The discharge tray 420 is disposed at an interval from the second pressing roll 240 in the rotation direction of the turntable 210.

Accordingly, the pork 1 coated with the breadcrumbs is pushed up on the discharge tray 420 by the second pressing roll 240, and is smoothly transferred through the discharge tray 420 by a plurality of driving wheels 422 (see FIG. 4), and finally is discharged through a discharge conveyor 430 connected to one end of the discharge tray 420 and is transferred to a packing box.

In this case, the discharge tray 420 and the discharge conveyor 430 configure the discharge unit 400.

Figure 6:
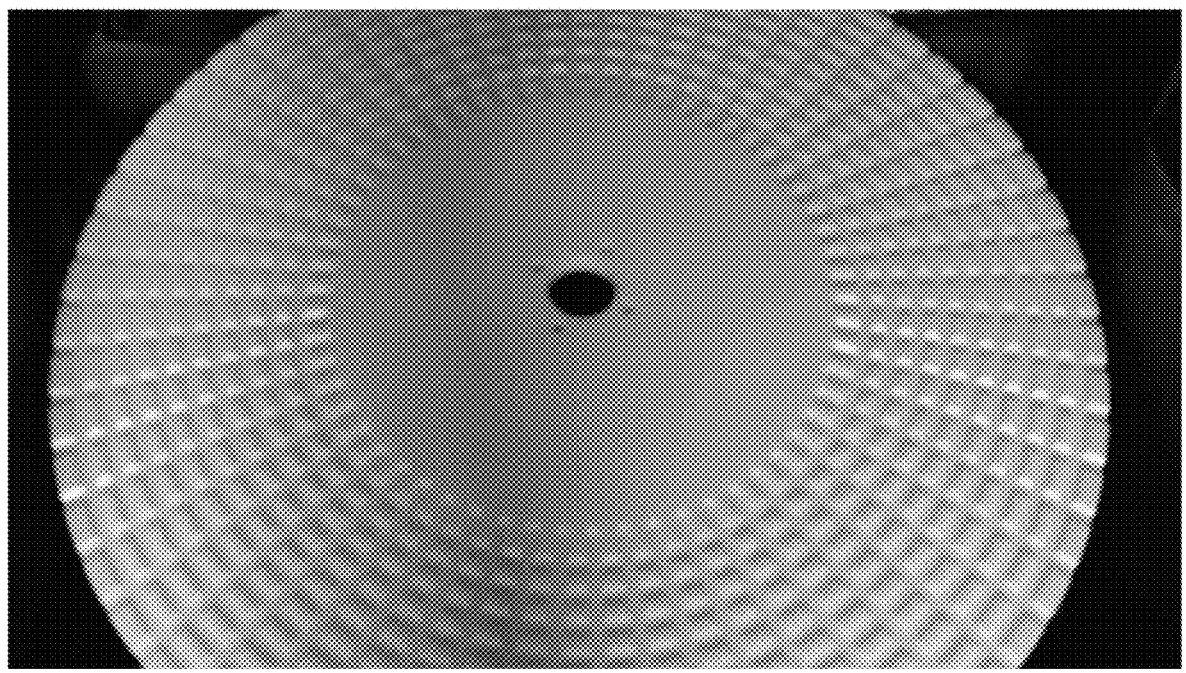
FIG. 6 is a photo of a sample showing a bottom surface shape of the turntable according to the present disclosure.

In addition, as shown in FIG. 6, the bottom surface of the turntable 210 may be uneven, that is, may have protrusions and recesses formed thereon. Discharge guides 410 are disposed to correspond to the recesses one by one in the diameter direction.

In particular, the bottom surface of the turntable 210 is implemented in the illustrated shape, such that the lower surface of the pork can be easily coated with the breadcrumbs and does not become flat even when being pressed. Therefore, when the pork is deep fried, a delicious-looking pork cutlet is made.

Figure 4:
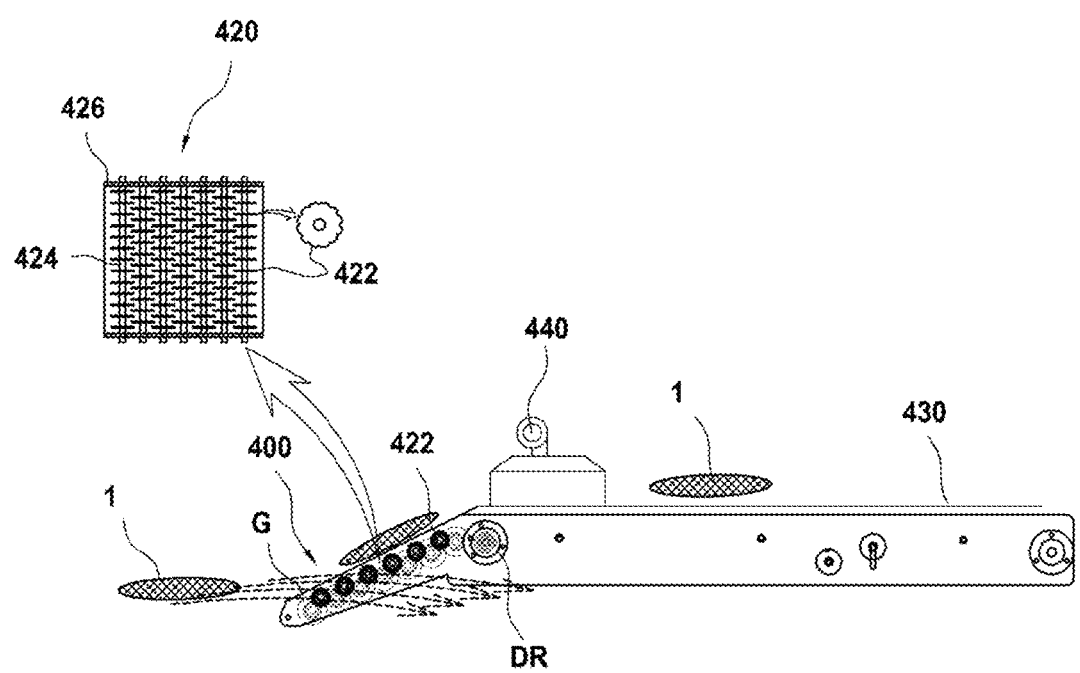
FIG. 4 is an exemplary view showing a discharge unit for discharging meat coated with breadcrumbs, in the configuration of FIG. 1.

In addition, the discharge tray 420 includes a driving unit (DR) receiving a driving force and rotating, and the plurality of driving wheels 422 rotated by the rotating force of the driving unit (DR) as shown in FIG. 4.

In this case, the driving wheels 422 may have protrusion and recesses formed along the circumferences thereof. This is to smoothly transfer the pork 1.

In addition, the plurality of driving wheels 422 are coupled and fixed to one wheel shaft 424 at regular intervals. A plurality of the wheel shafts 424 having the above-described structure may be rotatably shaft-fixed onto a table frame 426, thereby configuring one discharge tray 420.

In particular, when the width of the driving wheel 422 is maintained 2 mm and a gap between the driving wheels 422 is maintained 30 mm, extra breadcrumbs easily pass through the driving wheels 422 and drop down. Therefore, an efficient cooking operation can be performed.

In addition, a gear (G) is installed on each wheel shaft 424 and the gears (G) are engaged with one another and are finally engaged with a gear fixed to the shaft of the driving unit (DR). Therefore, the driving force is easily transmitted and thus the driving wheels 422 are individually driven.

The gears G should be appropriately arranged to rotate the driving wheels in the same direction. The gear G may be fixed to one end of the wheel shaft 424 or may be disposed between the driving wheels 422.

In this case, the individual driving of the driving wheels 422 are not necessarily achieved by connection of the gear (G), and may be achieved by well-known various methods.

In addition, a leveling blade 450 may be disposed above an upper portion of the discharge tray 420, being spaced therefrom as shown in FIGS. 1 and 2.

In this case, the leveling blade 450 may be inclined to correspond to an angle of inclination of the discharge tray 420, and may be disposed at a lower portion of one end of a fixing box 452 fixedly connected to the fixing housing 214. A blade motor 454 is embedded in the fixing box 452.

In addition, breadcrumbs of a predetermined thickness or more from among the breadcrumbs coated on the upper portion of the pork 1, which is being elevated through the discharge tray 420, are scarfed by the rotation of the leveling blade 450, and the scarfed breadcrumbs are dropped down to the inside of the turntable 210 and are reused. Accordingly, the rotation direction of the leveling blade 450 may be the counter clockwise direction as on the drawing.

In addition, a blower 440 may further be disposed on a boundary between the discharge tray 420 and the discharge conveyor 430 to finally remove the remaining breadcrumbs that do not adhere to the surface of the pork 1.

The blower 440 blows air introduced from the side downwardly, thereby dropping the breadcrumbs that do not completely adhere to the surface of the pork 1 and remains back to the inside of the turntable 210. Therefore, waste of the breadcrumbs can be prevented and the quality of a product of the pork 1 can be enhanced.

Furthermore, the introduction unit 300 is disposed at a position opposite the discharge unit 400.

The introduction unit 300 is a unit that includes a function of covering the pork 1 with egg wash, and is a device that introduces the pork covered with egg wash into the turntable 210.

Figure 5:
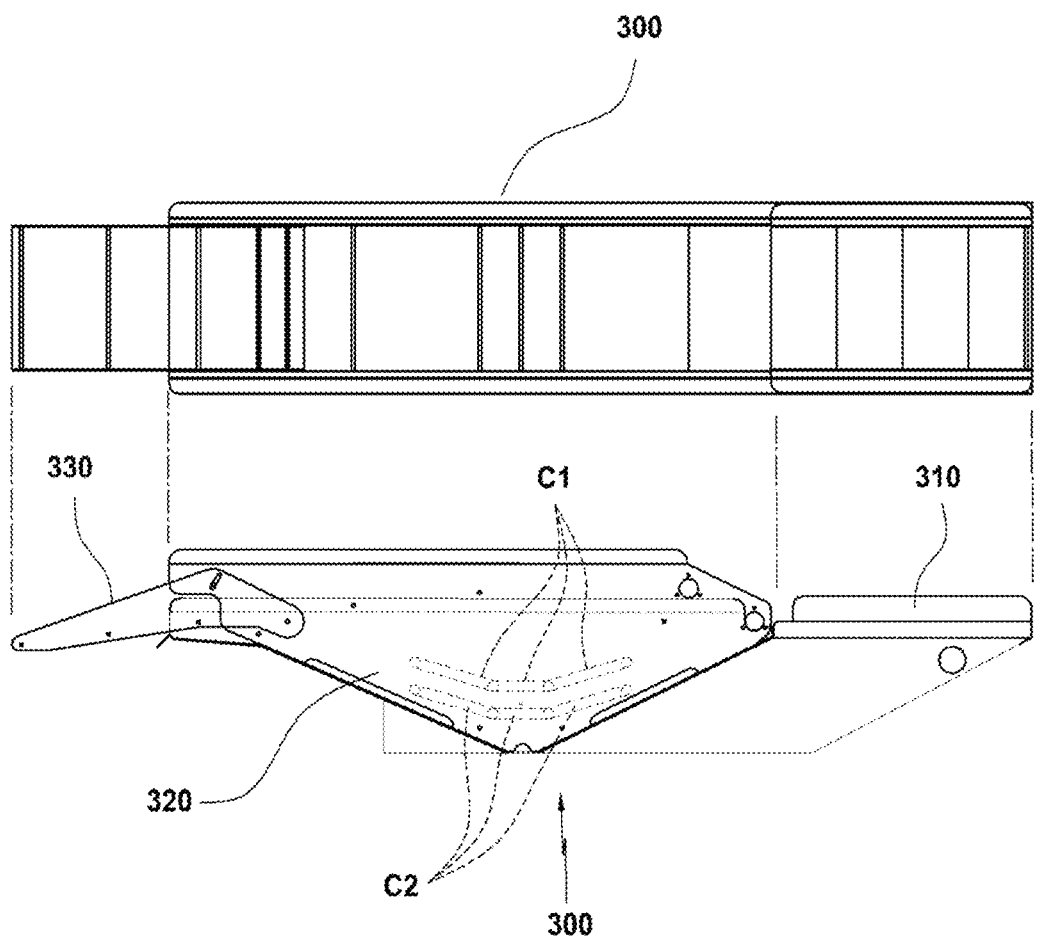
FIG. 5 is an exemplary view showing an introduction unit for covering spread meat with egg wash, and introducing the meat into a breadcrumb coating unit, in the configuration of FIG. 1.

The introduction unit 300 is a kind of liquid receiver, and as shown in FIG. 5, is configured to allow the pork 1 transferred through a transport conveyor 310 to pass through an egg wash receptacle 320 and to be covered with egg wash, and to allow the pork 1 covered with egg wash and spread to be introduced into the turntable 210 through the introduction guide conveyor 330.

In this case, when the pork passes through the egg wash receptacle 320, the pork is guided through an upper wire mesh conveyor C1 and a lower wire mesh conveyor C2, such that the pork is smoothly transferred and the egg wash covers both side surfaces of the pork through the pores on the wire mesh.

The pork transferred through the lower wire mesh conveyor C2 may float when it is immersed in the egg wash. In this case, the wire mesh conveyors are disposed on upper and lower portions to prevent the pork from floating due to the presence of the upper wire mesh conveyor C1. When the pork passes between the two wire mesh conveyors, the upper and lower surfaces of the pork are well covered with egg wash.

In addition, the pork which is separated from the turntable 210 and is elevated through the discharge unit 400 is discharged through the transport conveyor and then is transferred to a next process or a deep-frying process.

In addition, a blowing unit (BLU) may further be disposed at an upper portion of an entrance end of the introduction guide conveyor 330 of the introduction unit 300 to blow and remove the egg wash remaining on the surface of the pork 1, such that the quality of the pork 1 can be enhanced.

Furthermore, the introduction guide conveyor 330 may have a lower end disposed in the space between the first and second scattering units 220, 222.

In addition, the breadcrumb supplier 500 includes a box-type case 510, first and second supply conveyors 520, 530 embedded in the case 510 and installed in multi-stage, and rotary hitting mallets 540 disposed on the upper portion of the second supply conveyor 530.

In addition, a sensor (not shown) may be installed at a portion of the turntable 210 to detect a height of breadcrumbs and to detect a shortage of breadcrumbs, and the first and second supply conveyors 520, 530 are driven according to a detecting operation of the sensor, and supply breadcrumbs.

In particular, the rotary hitting mallets 540 include a plurality of rectangular blocks arranged on a shaft at regular intervals and fixed at different angles, and include the shafts in plural rows. The breadcrumbs may be introduced in the lump and thus should be hit and broken. This is the reason why the rotary hitting mallets 540 are required.

Accordingly, the rotary hitting mallets 540 hit the supplied lump of breadcrumbs while being rotated, and break the same, and supply the breadcrumbs in the form of powder.

In this case, the plurality of rows of the rotary hitting mallets 540 may receive a driving force from a driving source through a chain or belt, and then adjacent rotary hitting mallets 540 may be rotated in opposite directions through gear engagement, thereby enhancing the efficiency of hitting and breaking.

The present disclosure having the above-described configuration has the following operation relationship.

While the pork 1 is transferred through the introduction unit 300, both surfaces of the meat are covered with egg wash.

In this state, when the pork 1 is introduced into the turntable 210, the lower surface of the pork 1 covered with egg wash comes into contact with breadcrumbs dispersed on the bottom surface of the turntable 210, and is automatically coated with breadcrumbs.

Next, the turntable 210 is rotated and the spread meat is rotated along with the turntable 210.

Then, when the pork 1 reaches the first scattering unit 220, the breadcrumbs drawn and scattered by the first and second scattering units 220, 222 cover the upper surface of the pork 1, and the upper surface of the pork 1 is automatically coated with the breadcrumbs.

Of course, this state refers to a state in which the breadcrumbs loosely cover the surface of the pork 1.

When the turntable 210 is continuously rotated in this state, the pork 1 coated with the breadcrumbs is pressed by the first and second pressing rolls 230, 240, and as a result, the breadcrumbs covering the upper surface and the lower surface of the pork 1 more securely and evenly adhere to the surfaces.

When the turntable 210 is further rotated with the pork 1 completely coated with the breadcrumbs, the pork 1 coated with the breadcrumbs reaches the discharge tray 420, is transferred through the discharge tray 420, is discharged through the discharge unit 400, and then is packed.

In this process, excessively coated breadcrumbs may be scarfed by the leveling blade 450, such that the breadcrumbs have an even thickness, that is, a constant thickness, and thus uniformity of quality can be ensured.

In addition, the sensor may detect a shortage of breadcrumbs existing on the turntable 210 as the pork 1 is coated with breadcrumbs, and the breadcrumb supplier 500 is driven according to a detection signal of the sensor, and automatically supplies a predetermined amount of breadcrumbs.

Accordingly, the present disclosure can almost completely automate the processes of covering the surface of the pork 1 with egg wash and coating the same with the breadcrumbs.

As described above, the present disclosure automatically covers the pork with egg wash and breadcrumbs, and presses the breadcrumbs with a predetermined pressure to let the same securely adhere to the pork. In addition, there are advantages that automation can be achieved with a small size facility, and productivity and uniformity of quality can be enhanced.

Another embodiment relatively simpler than the above-described embodiment is possible. In an embodiment, an operator may directly place pork covered with flour and egg wash on an upper surface of a turntable-type breadcrumb coating machine, and may coat the pork with breadcrumbs, and may remove the pork coated with the breadcrumbs.

Figure 7:
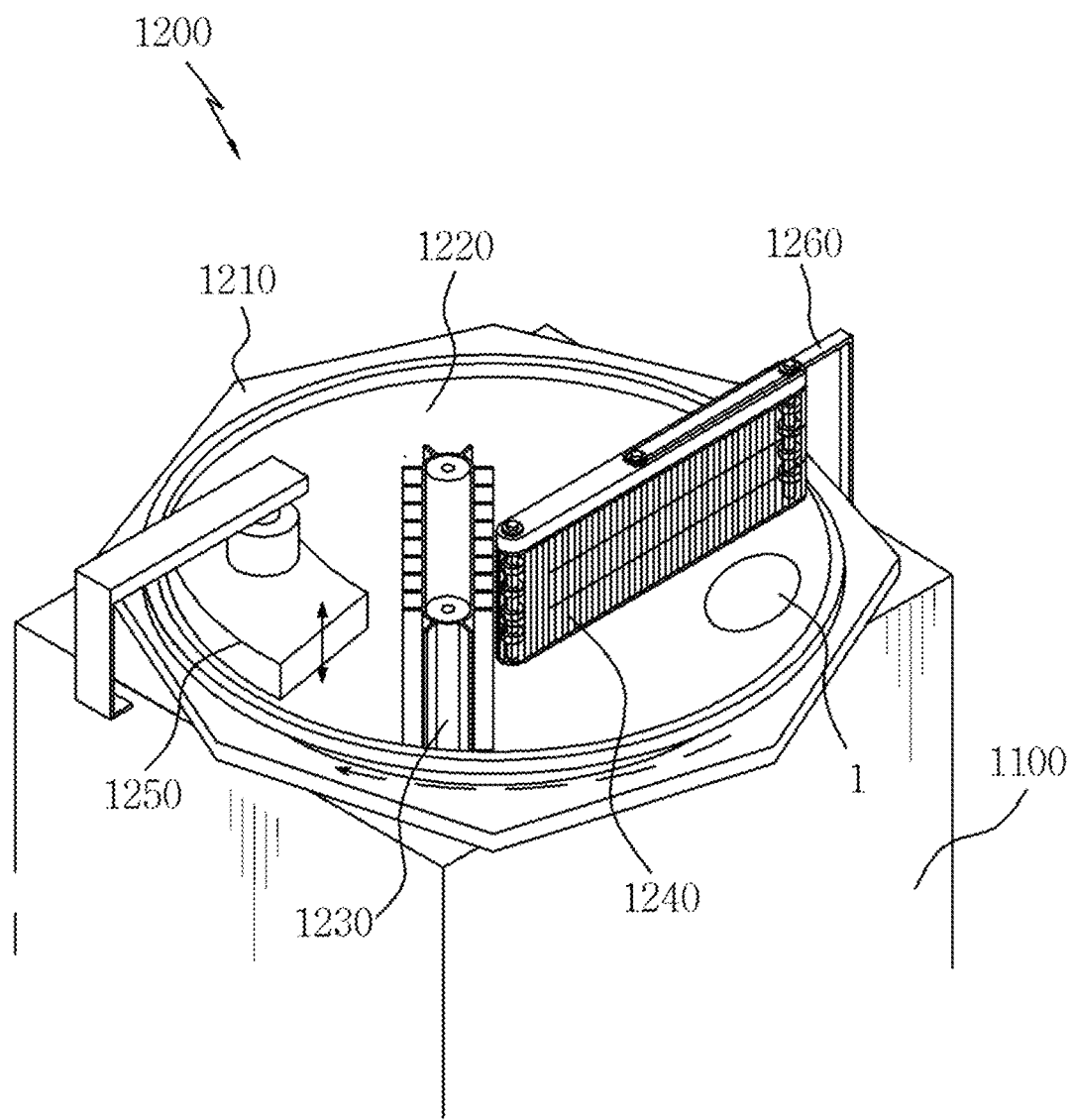
FIG. 7 is an exemplary perspective view of another example of a turntable-type breadcrumb coating machine according to the present disclosure.
Figure 8:
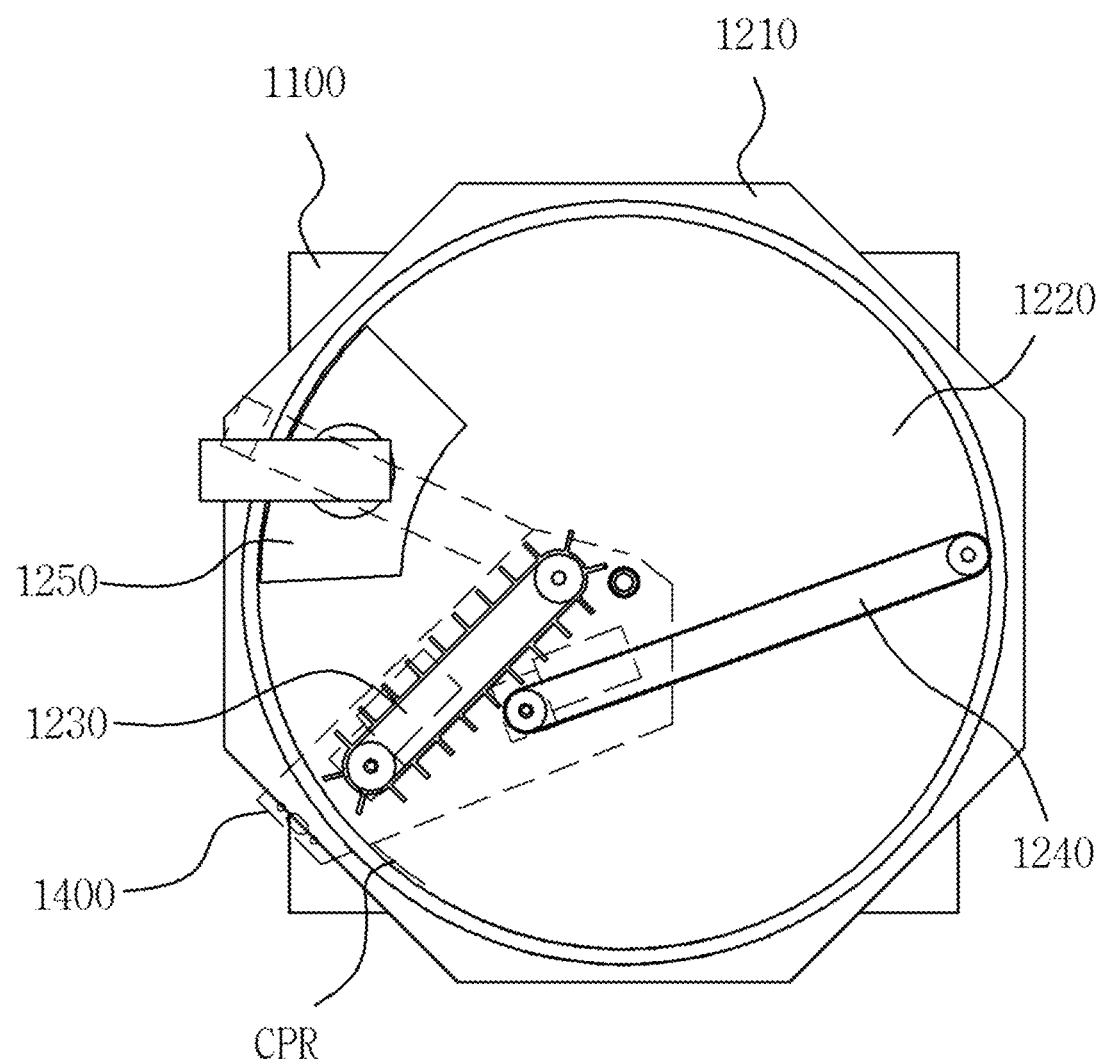
FIG. 8 is a top view of the embodiment of FIG. 7.

As shown in FIGS. 7 and 8, a turntable 1220-type breadcrumb coating machine according to the present disclosure includes a base 1100.

In this case, the base 1100 may have a rectangular box shape and may have a rectangular frame shape according to a situation.

A breadcrumb coating unit 1200 including an octagonal frame 1210 and the turntable 1220 may be disposed at one side of an upper surface of the base 1100. The breadcrumb coating unit 1200 of this configuration includes the fixed octagonal frame 1210, the rotary turntable 1220, first and second scattering units 1230, 1240 for coating an upper surface of pork with breadcrumbs by scattering the breadcrumbs, and a pressing plate 1250 for pressing the upper surface of the pork coated with the breadcrumbs.

The octagonal frame 1210 is formed to allow an operator to place the pork covered with flour and egg wash on a right position on the upper surface of the turntable 1220 or remove the same.

Specifically, the operator may position in front of a predetermined side of the sides of the octagonal frame 1210 and then place the pork covered with flour and egg wash at an exact point on that position, and another operator may position in front of another side of the sides of the octagonal frame 1210 except for the side where the pork is placed, and may remove the pork coated with the breadcrumbs.

That is, the octagonal frame 1210 may be provided to allow the pork to be placed at the exact point of the upper surface of the turntable 1220 and to be removed after being coated with the breadcrumbs.

The octagonal frame 210 may be formed to be larger than the turntable 1220, which will be described below, such that the operator can lean against the predetermined side of the octagonal frame 1210 and work in order to enhance working efficiency and to work more easily.

The turntable 1220 and the first and second scattering units 1230, 1340 are the same as in the above-described embodiment, and thus additional explanation is omitted, and the pressing plate 1250, which is a distinct feature, will be described.

The pressing plate 1250 is disposed at an interval from the fixing housing 1400 in the clockwise direction. In this case, the pressing plate 1250 is a means for pressing the breadcrumbs coated on the upper surface of the pork with a predetermined pressure, and letting the breadcrumbs well adhere to the pork, and should have a pressure and thus is fixed to a circular cylinder capable of adjusting the pressure. The pressing plate 1250 may be formed in a shape of

by two arcs which are concentric with respect to the turntable 1220, and two lines connecting the two arcs.

The pressing plate 1250 may be coupled to a piston of the circular cylinder coupled to a support, and may be configured to be move up and down, but this should not be considered as limiting.

Accordingly, a force of pressing the upper surface of the pork coated with the breadcrumbs, that is, the breadcrumbs, can be adjusted, and thus the process can be performed so that there is less remainder of the breadcrumbs when the pork is completely coated with the breadcrumbs.

The pork coated with the breadcrumbs may pass through the pressing plate 1250 by the rotation of the turntable 1220 and may be removed by the operator.

Herein, the rotation of the turntable may be stopped during the operation of the pressing plate 1250.

In addition, the pressing plate 1250 adopts a structure capable of pressing while moving in the same direction and at the same speed as those of the turntable 1250, and thus the turntable can be continuously rotated even during the operation of the pressing plate.

As described above, the present disclosure has the merits that the pork covered with egg wash is coated with breadcrumbs and the breadcrumbs are pressed by a predetermined pressure and securely adhere to the pork, and automation can be achieved with a small facility and productivity and uniformity of quality can be enhanced.

What is claimed is:

1. A breadcrumb coating machine comprising a breadcrumb coating unit for spreading and fixing breadcrumbs on a pork cutlet,
wherein the breadcrumb coating unit comprises:
an octagonal frame formed in a regular octagon shape and disposed on an upper surface of a base;
a turntable having the breadcrumbs dispersed over a surface thereof and configured to rotate on an upper surface of the octagonal frame;
first and second scattering units configured to draw the breadcrumbs dispersed on the surface of the turntable and to scatter the breadcrumbs over the pork cutlet; and
a pressing plate disposed at an interval from the first and second scattering units in a clockwise direction to press the pork cutlet, while adjusting a pressure by using a cylinder,
wherein the second scattering unit is a wire mesh conveyor that rotates in a continuous track and transfers the breadcrumbs from a center of the turntable toward a circumference thereof, and is in an upright position, and has a lower end spaced from a bottom surface of the turntable by a distance, and one end disposed adjacent to a portion of a length of the first scattering unit.

\* \* \* \* \*